E. A. PERKINS.
SHOCK ABSORBER FOR VALVES.
APPLICATION FILED JUNE 16, 1913.

1,091,238.

Patented Mar. 24, 1914.
2 SHEETS—SHEET 1.

Attest:
Mary H. Lewis
Helen V. Fitzpatrick

Edwin A. Perkins, Inventor:
by William R. Baird
his Atty

E. A. PERKINS.
SHOCK ABSORBER FOR VALVES.
APPLICATION FILED JUNE 16, 1913.

1,091,238.

Patented Mar. 24, 1914.
2 SHEETS—SHEET 2.

Attest:
Mary H. Lewis
Helen V. Fitzpatrick

Inventor:
Edwin A. Perkins
by William R. Baird
his Atty

UNITED STATES PATENT OFFICE.

EDWIN A. PERKINS, OF NEW YORK, N. Y.

SHOCK-ABSORBER FOR VALVES.

1,091,238.  Specification of Letters Patent. Patented Mar. 24, 1914.

Application filed June 16, 1913. Serial No. 773,891.

*To all whom it may concern:*

Be it known that I, EDWIN A. PERKINS, a citizen of the United States, residing at New York, in the county of New York and State of New York, have invented certain new and useful Improvements in Shock-Absorbers for Valves, of which the following is a specification.

This invention relates to cushioning devices adapted for use with valves and similar mechanisms, and its novelty consists in the construction and adaptation of the parts, as will be more specifically hereinafter pointed out.

The invention has been applied more particularly in connection with puppet valves used in air compressors and will be described in such connection, but it will be understood that it may be used in any relation where the principles governing it are applicable.

The energy delivered by a puppet valve when contacting with its seat on coming to rest must be absorbed by a force acting through a distance. The product of this force times the distance is work which must equal the energy to be absorbed. If the distance is very small the force must be very large, and if the distance can be increased the force can be decreased.

It is the object of this invention to decrease the force by increasing the distance.

Figure 1:
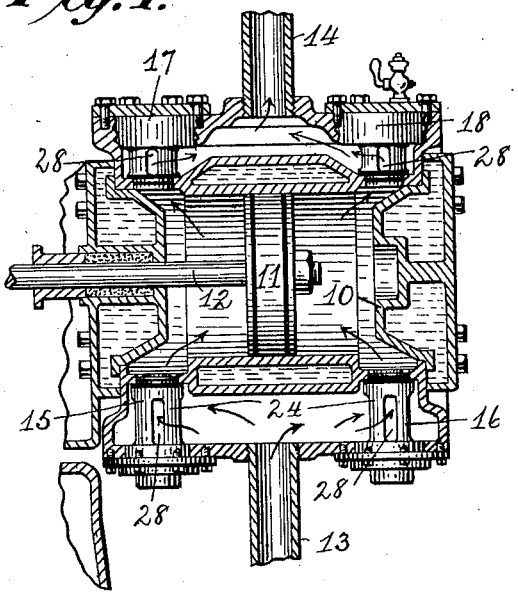
Figure 2:
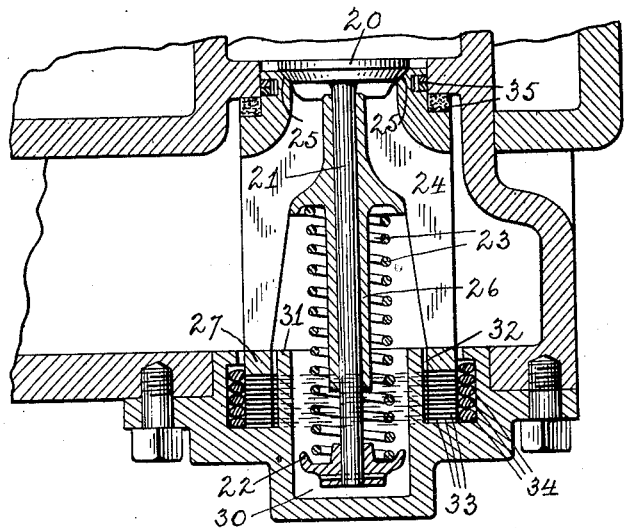
Figure 3:
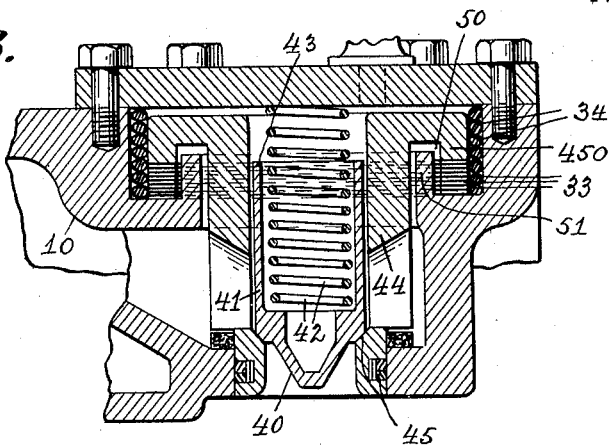
Figure 4:
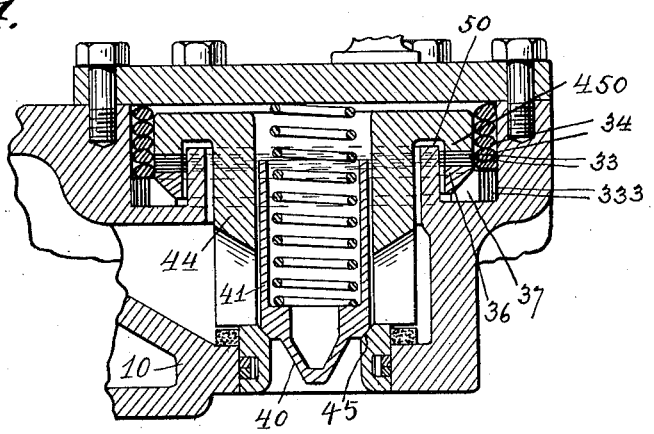
Figure 5:
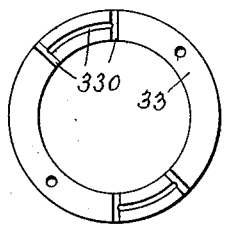
Figure 6:
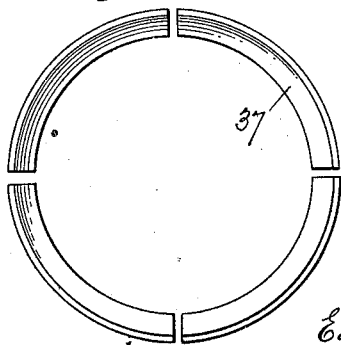

In the drawings, Figure 1 is a vertical longitudinal section through the cylinder of an air compressor showing the puppet valves in elevation; Fig. 2 is a similar but enlarged section through one of the inlet valves; Fig. 3 is a section similar to Fig. 2 but of one of the outlet valves; Fig. 4 is a section of a modified form of an inlet valve showing a modified or compound form of the cushioning device; Fig. 5 is a detail of one of the ordinary cushion plates; and Fig. 6 is a detail of one of the intermediate rings used with the compound form of the device.

In the drawings, 10 represents the cylinder of a usual form of air compressor, 11 being the piston, 12 the piston rod, 13 the inlet conduit and 14 the outlet conduit.

15 and 16 are inlet valves, and 17 and 18 are outlet valves controlling the flow of the air into and out of the cylinder. Both of the inlet valves are alike. They each comprise a valve disk 20, a valve stem 21, a stop 22 and a retracting spring 23. A cage 24 set within the frame of the compressor is provided with a seat 25 coöperating with the disk 20. A tubular flange 26 surrounds the valve stem 21 and against its lower edge the stop 22 is adapted to impinge if the stroke of the valve is long enough. The cage is also provided with a depending annular flange 27, and with air inlet apertures 28, Fig. 1.

Each inlet valve is set in a removable portion of the cylinder casing comprising a tubular recess 30 to receive the valve stem, and its surrounding spring. This recess is bounded by an annular flange 31 and on its outer side is an annular groove 32 adapted to receive a series of superimposed cushion rings or plates 33 surrounded by a mass of wicking 34 or other suitable absorbent carrier for oil. Oil is placed between the cushion rings or plates and within the annular groove 32, and the places of contact between the cage and the cylinder casing are suitably packed, as indicated at 35.

Both of the outlet valves are alike. They each comprise a tubular valve 40 on the end of a stem 41, an internal retracting spring 42. The upper edge 43 of the valve stem serves as a stop. A cage 44 set within the frame of the compressor surrounds the valve. It is provided with a seat 45 coöperating with the valve 40. It is also provided with a reverted annular flange 450. Each outlet valve is set in a removable portion of the cylinder casing comprising an annular recess 50, bounded on the inner edge by an annular flange 51. This recess is adapted to receive a series of superimposed cushion rings or plates 33 in all respects like the similar plates described as used with the inlet valves and they are surrounded by a mass of wicking 34 or other suitable absorbent carrier for oil.

In Fig. 4 there is illustrated a modified form of the device shown in Fig. 3, in which the reverted annular flange 450 is made shorter, and in addition to the cushion rings 33 which are reduced in number, there is provided under the wicking 34 which is made smaller in quantity, a series of vertically arranged cushion plates 333, and intermediate these plates and the plates 33, there are arranged two rings 36 and 37 with beveled contacting edges, the outer and lower ring being split as shown in Fig. 6.

In Fig. 5 there is shown a detail of one of the cushion rings 33 showing oil channels 330 with which it is preferably provided.

When a puppet valve without a cushioned seat comes to rest, the valve and the seat being rigid, there is no distance through which the force exerted can act. Consequently the force is excessive and the stresses set up exceed the elastic limit of the surface metal and it is crushed a little. This action being continued the valve is allowed to settle an appreciable amount and the distance thus provided reduces the force and its stresses to within the elastic limit of the metal. It is in this manner that such valves wear when not cushioned. When new, under a magnifying glass, the metal plates present a roughened surface, but after the valve has been used this surface is seen to have been battered down and to have become smooth and polished in comparison with its original appearance. It is also quite usual for the metal of the valves and valve seats to become crystallized and brittle under such continued stresses near the elastic limits of the metal.

With the described invention the necessary distance for the force of impact to act through is originally provided by the presence of the series of cushion rings 33 under the flange 27 of the inlet valve and the flange 450 of the outlet valve. These rings are superimposed one above the other and may be used dry or immersed in oil. If used dry they will gradually batter down to such smooth surfaces that they will be in very close contact and their cushioning effect will be lost and they will have to be replaced or their contacting faces roughened. If immersed in oil the cushioning effect and wear of impact will practically all come upon the oil so that the wear upon the plates will be much lessened. Other fluids than oil may be employed, and any medium which will form in films between the adjacent surfaces of the cushion rings, and is otherwise suitable, may be employed.

The cushion plates must be kept in contact and confined against lateral displacement. In the embodiment of the invention illustrated the cushion rings are located within the annular recess in the casing for that purpose. The surrounding mass of wicking will prevent their movement in an outward direction and the inner flange of the casing will prevent their movement in an inward direction. In the modified form illustrated in Fig. 4 the use of the intermediate beveled rings allows the direction of the force to be varied and thus utilizes the strength of the casing wall to resist the force exerted.

It will be understood, of course, that the cushion plates or rings may be so arranged as to absorb the shock of the impact of a moving portion of the valve instead of a moving portion of the cage embodying the valve seat. A modification of this nature is quite within the skill of the ordinary mechanic to accomplish and would constitute no departure from the principles of the invention.

What I claim is:

1. In an air compressor, or similar mechanism provided with valves and coöperating valve seats adapted to be brought together with force, a shock absorbing device, comprising a series of contacting plates confined within a limited lateral area and adapted to receive the impact of the moving valve when it is brought to its seat, in combination with a fluid medium in which the plates are immersed.

2. In an air compressor, or similar mechanism provided with valves and coöperating valve seats adapted to be brought together with force, a shock absorbing device, comprising a series of contacting plates confined within a limited lateral area and adapted to receive the impact of the moving valve when it is brought to its seat, in combination with a fluid medium in which the plates are immersed, and means for preventing the escape of such medium.

3. In an air compressor, or similar mechanism provided with valves and coöperating valve seats adapted to be brought together with force, a shock absorbing device, comprising a series of contacting plates confined within a limited lateral area and adapted to receive the impact of the moving valve when it is brought to its seat, in combination with a fluid medium in which the plates are immersed, and means for preventing the escape of such medium including an adjacent mass of absorbent material.

4. In an air compressor, or similar mechanism provided with valves and coöperating valve seats adapted to be brought together with force, a shock absorbing device, comprising a series of contacting plates confined within a limited lateral area and adapted to receive the impact of the moving valve when it is brought to its seat, in combination with a fluid medium in which the plates are immersed, and means for preventing the escape of such medium including an adjacent mass of absorbent material such as wicking.

5. In combination, a valve seat, a valve, a rigid member moving with the valve and a series of contacting plates against which the moving member is adapted to impact as the valve reaches its seat, and a fluid medium between and surrounding the plates.

6. In combination, a casing provided with a recess adapted to contain a series of contacting plates, a cage within the casing provided with a valve seat, a valve within the cage and a portion of the cage rigid with the valve seat in contact with the plates and adapted to be impacted against the plates as the valve is forced to its seat.

7. In combination, a casing provided with a recess adapted to contain a series of contacting plates, a cage within the casing provided with a valve seat, a valve within the cage and a portion of the cage rigid with the valve seat in contact with the plates and adapted to be impacted against the plates as the valve is forced to its seat, the plates being immersed in a mass of oil.

8. In a device of the character described, a casing provided with an annular recess, a series of plates therein, a cage having a part adapted to be impacted against the plates, and a valve adapted to be moved against the cage in closing.

9. In a device of the character described, a casing provided with an annular recess, a series of plates therein, a cage having a part adapted to be impacted against the plates, and a valve adapted to be moved against the cage in closing in combination with a mass of oil within the plate-containing recess.

10. In a device of the character described, a casing provided with an annular recess, a series of plates therein, a cage having a part adapted to be impacted against the plates, and a valve adapted to be moved against the cage in closing in combination with a mass of oil within the plate-containing recess and means as wicking adapted to prevent its escape.

In testimony whereof I affix my signature in presence of two witnesses.

EDWIN A. PERKINS.

Witnesses:
MARY H. LEWIS,
HELEN V. FITZPATRICK.

Copies of this patent may be obtained for five cents each, by addressing the "Commissioner of Patents, Washington, D. C."